INVENTORS.
SHERMAN L. LARSON
CARL C. BEER

BY Seidel & Gonda
ATTORNEYS

April 21, 1970  S. L. LARSON ET AL  3,506,995
VEHICLE WASHER
Filed March 20, 1968  5 Sheets-Sheet 2
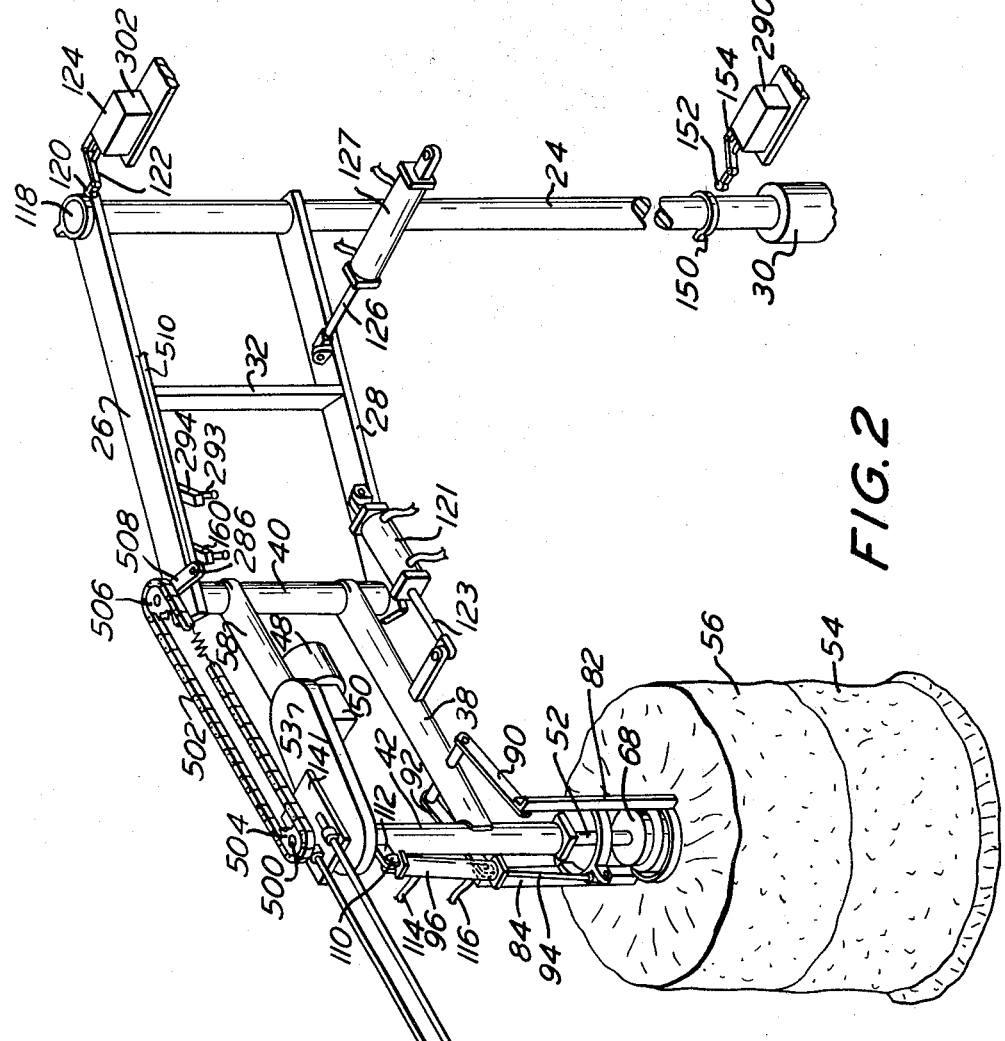
FIG. 2
FIG. 4
FIG. 5
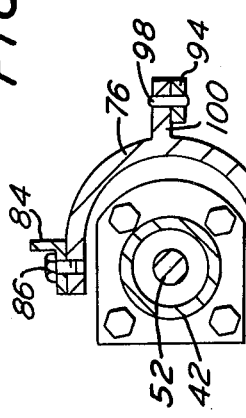
INVENTORS
SHERMAN L. LARSON
CARL C. BEER
BY
Seidel & Gonda
ATTORNEYS

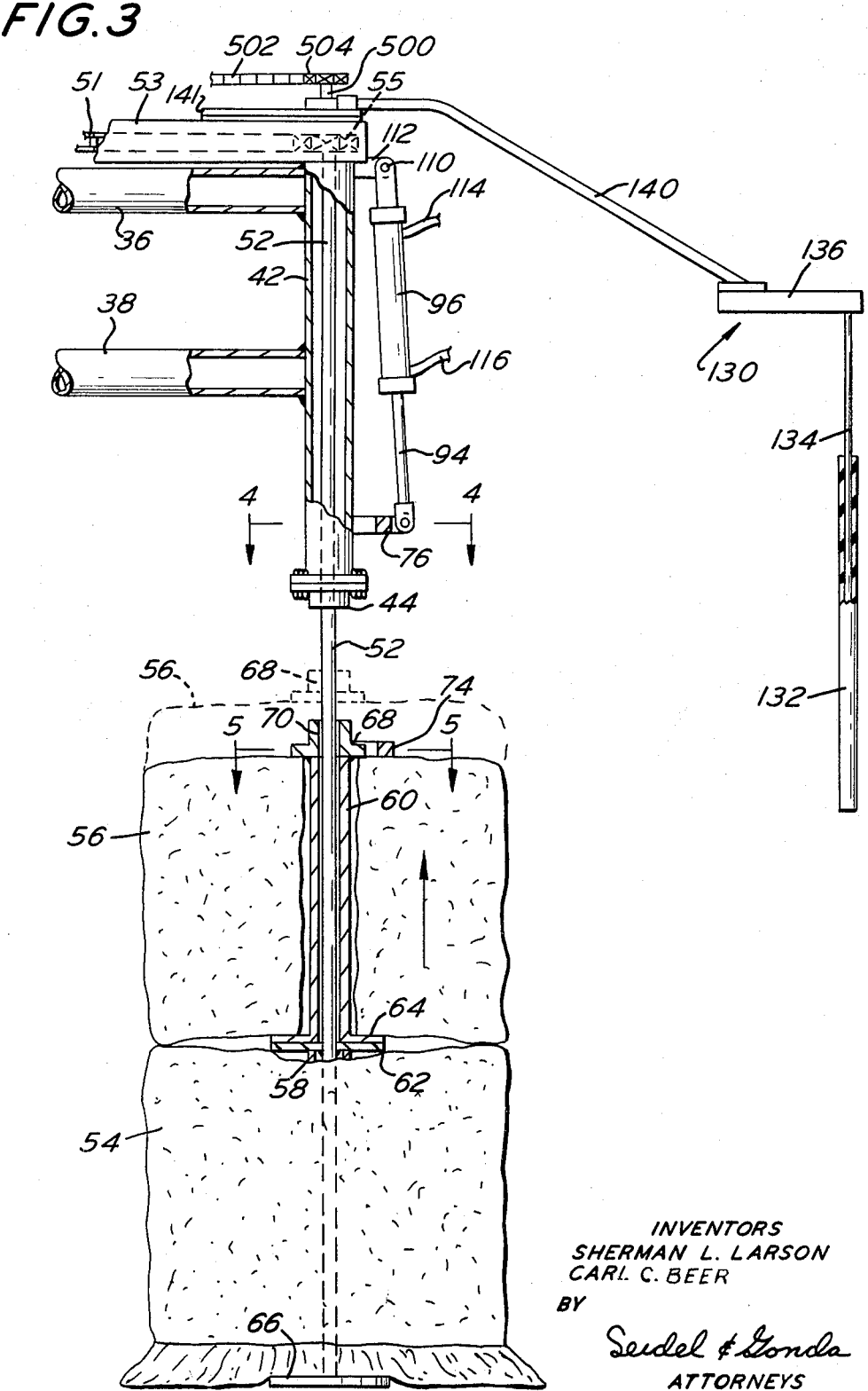

April 21, 1970    S. L. LARSON ET AL    3,506,995
VEHICLE WASHER

Filed March 20, 1968    5 Sheets-Sheet 4

FIG. 6

INVENTORS
SHERMAN L. LARSON
CARL C. BEER

BY

Seidel & Gonda
ATTORNEYS

INVENTORS
SHERMAN L. LARSON
CARL C. BEER
BY
Seidel & Gonda
ATTORNEYS

United States Patent Office 3,506,995
Patented Apr. 21, 1970

3,506,995
VEHICLE WASHER
Sherman L. Larson, Palmyra, N.J., and Carl C. Beer, Philadelphia, Pa., assignors to Sherman Car Wash Equipment Company, Palmyra, N.J., a corporation of New Jersey
Filed Mar. 20, 1968, Ser. No. 714,660
Int. Cl. B60s 3/06; A46b 13/02
U.S. Cl. 15—21
9 Claims

ABSTRACT OF THE DISCLOSURE

A vehicle washer of the wrap-around brush type wherein the brush units can be selectively divided into two sections consisting of a first section which continuously rotates during the operation of the vehicle washer and a second section which is selectively rotated by engaging it to the first section in response to deflection of a vehicle sensing means. The brush units are used to wash the side and rear windows of vehicles and yet avoid damaging antennas and other vehicle projections.

---

This invention relates to a vehicle washer. More particularly, this invention relates to a vehicle washer of the type where the brush follows the contour of the front, side and rear of the vehicle and is of sufficient height to wash the windows, including the rear window of a station wagon.

In United States Patent 3,310,824 issued Mar. 28, 1967 to Carl Beer there is disclosed a vehicle washer which engages the front, side and rear of an automobile to apply a brushing action to the same. This particular vehicle washer has proven to be an effective machine capable of accomplishing its intended purpose. The vehicle washer disclosed in Patent 3,310,824, however, has a disadvantage in that the height of the brush is limited so that it does not engage the vehicle windows. It is not merely a matter of lengthening the brush to overcome this disadvantage. The typical car wash brush consists of a great number of bristles, usually made of a plastic material, which hang limply from a central support. The centrifugal action of a rotating brush causes the bristles to extend outwardly from the hub or other bristle supporting structure and be in effect slapped against the side of a vehicle. If the brush in Patent 3,310,824 were merely elongated so that it would engage the windows of an automobile, the bristles would also engage the aerial, wrap about it, and rip it from its mount.

The present invention solves the problem inherent in the use of a single brush and at the same time overcomes its disadvantage in that it is capable of washing all the side window surfaces and the rear window areas of station wagons and the like. The invention provides a brush unit which is divided into two sections that are separable. The first section is continuously driven during the operation of the vehicle washer. The second section is driven by engaging it with the first section. Engagement is effected by reciprocating the second brush section toward the first. When it is desired to stop the second brush section from rotating, it is reciprocated away from the first section to cause disengagement. Control is effected by a sensing arm which is struck by the vehicle and triggers a control system.

Another advantage of the present invention is that it incorporates an overhead mounting for the entire brush unit, thus allowing complete freedom to manipulate the brush about the vehicle.

For the purpose of illustrating the invention, there is shown in the drawings a form which is presently preferred; it being understood, however, that this invention is not limited to the precise arrangements and instrumentalities shown.

FIGURE 2 is a perspective view of one of the brush units shown in FIGURE 1.

FIGURE 3 is an elevation, partly in section, of the brush unit shown in FIGURE 2.

FIGURE 4 is a transverse sectional view of the brush unit shown in FIGURE 3 taken along line 4—4.

FIGURE 5 is a partial sectional view of the brush unit shown in FIGURE 3 taken along line 5—5.

FIGURE 6 is a schematic view of the pneumatic-hydraulic circuity used to control the brush unit of the present invention.

Referring now to the drawings in detail, wherein like numerals indicate like elements, there is shown in FIGURE 1 a vehicle washer designated generally as 10.

Figure 1:
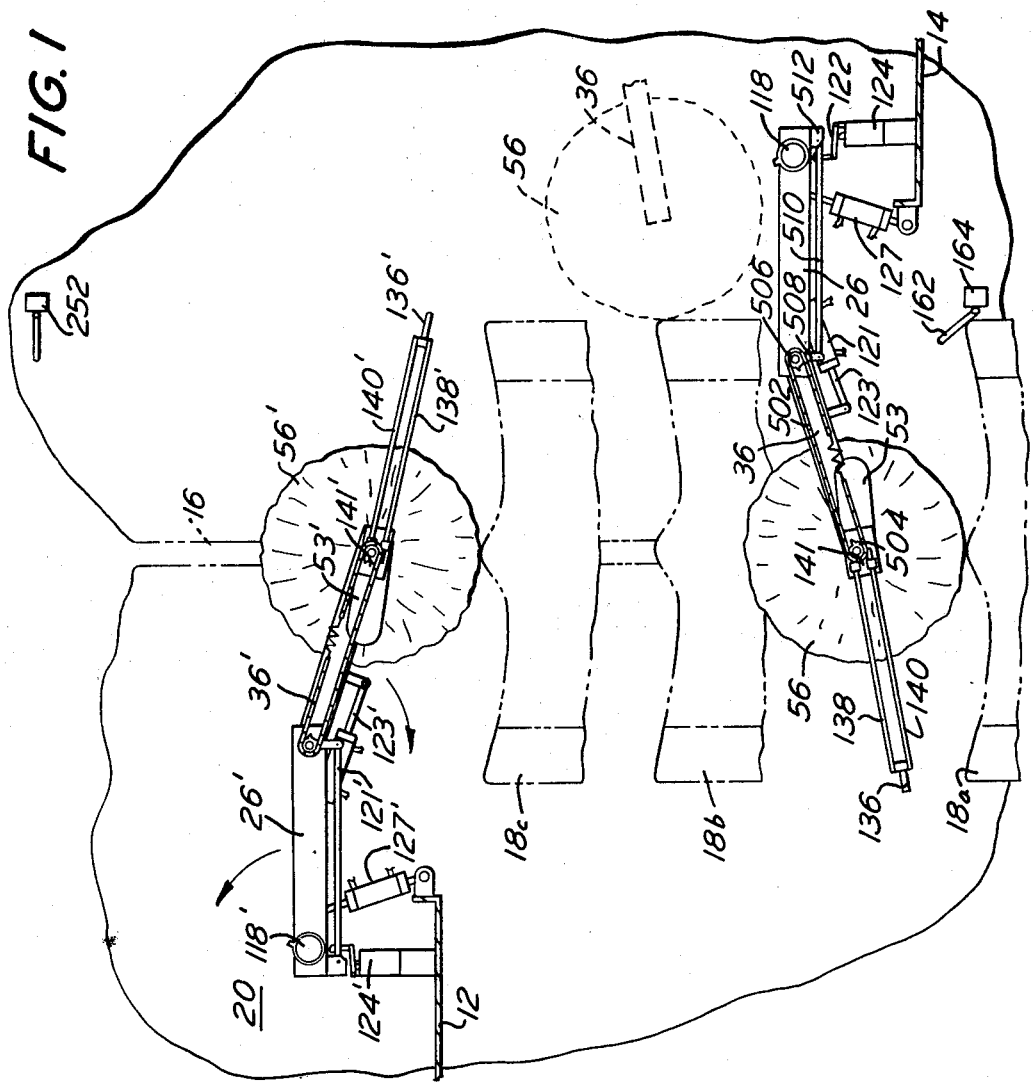
FIGURE 1 is a plan view, partly in section, of a vehicle washer in accordance with the present invention.

The vehicle washer includes housing designated generally as 12 and 14 which are positioned on opposite sides of a passage through which the vehicle to be washed is moved by a conveyor system diagrammatically illustrated as 16. The vehicle to be washed is diagrammatically illustrated at successive washing positions by the numerals 18a, 18b and 18c. As clearly shown in FIGURE 1, housings 12 and 14 are staggered along the conveyor 16 and open toward each other. Each of the housings 12 and 14 encloses a wrap-around brush unit designated generally as 20 and 22, respectively. Each of the brush units 20 and 22 are identical in structure, but are of opposite hand. Accordingly, it is only necessary to describe unit 22 in detail. Like elements on brush 20 are designated in the drawing with corresponding primed numerals.

The vehicle 18 is pulled or pushed through the passage between the brush units 20 and 22 by any conventional conveyor system 16. As explained in United States Patent 3,310,824, the operation of the brush unit 20 and 22 is sequential. Hence, the brush unit 22 first operates upon the right front, right side and right rear of the vehicle 18 as it proceeds between the brush units 20 and 22. Before the brush unit 22 completes its operation, the brush unit 20 begins operating upon the left front, left side and left rear of the vehicle 18. The staggered sequential operation of the brush units 20 and 22 is necessary since their point of application overlaps at the middle front and middle rear as illustrated in FIGURE 1.

The brushing unit 22 is supported from rotatable post 24 by brackets 26 and 28 which are fixed to the post. Post 24 is rotatably mounted in a bearing 30 so that it may be pivoted about its axis. A brace 32 extends between and is fixed to brackets 26 and 28. The structure comprising post 24, brackets 26 and 28, and brace member 32 form what is hereinafter referred to as a first pivotable arm.

Parallel arms 36 and 38 are rigidly connected to upright posts 40 and 42 to define a rectangular support structure which defines a second pivotable arm for the brush unit. As shown, the post 40 is pivotally pinned to brackets 26 and 28 and pivots relative to them. For structural rigidity, all of the posts 24, 40 and 42 as well as arms 36 and 38 may be hollow tubular members.

As best shown in FIGURE 3, the hollow post 42 extends well below arm 38 and terminates at its distal end with a bushing 44 which is bolted thereto. A drive motor 48 and a gear box 50 with appropirate gearing sprockets for driving the chain 51 are mounted on arm 36. Chain 51, within housing 53, drives a sprocket 55 on the end of shaft 52. Shaft 52 extends downwardly through the post 42, the bushing 44, the hub 60 of brush 56, the clutch plate 62, the hub 58 of brush 54 and terminates in plate 66 to which it is fixed. The hubs 58 and 60 support the bristles for the brushes 54 and 56 in any conventional manner. Shaft 52 is fixed to the brush 54 by connecting it to clutch plate 62 and to plate 66 which in turn are fixed to hub 58. Hence, rotation of shaft 52 as effected by motor 48 and chain 51 causes rotation of brush 54.

The end of hub 60 closest to post 42 terminates in a bearing 68 shown in FIGURE 5. The inner race 70 of bearing 68 is fixed to the hub 60 and rotates with it. The outer race 72 is connected to U-shaped bracket 74 by the bolts 78 and 80. The end of hub 60 closest to brush 54 is fixed to clutch plate 64 which is positioned to frictionally engage clutch plate 62.

From the foregoing, it should be apparent that brush 56 is mounted to freely rotate relative to the shaft 52. Moreover, the brush 56 may be caused to rotate with brush 54 by engaging clutch plates 62 and 64 so that the driving force applied to brush 54 through shaft 52 is transferred to brush 56. To stop the rotation of brush 56, it is only necessary to disengage the clutch plates 62 and 64.

As stated above, outer race 72 is bolted to bracket 74 which in turn is connected to U-shaped bracket 76 by the rigid angle members 82 and 84. Angle members 82 and 84 are fixed to bracket 76 by bolts 86 and 88 or any other conventional fastening means. Angle members 82 and 84 are fixed to the bracket 74 by the same bolts 78 and 80 that connect the bracket 74 to outer race 72. The opposite uppermost ends of angle members 82 and 84 are pivotally connected to links 90 and 92 which are in turn pivotally connected to arm 38.

As best shown in FIGURES 2 and 4, one end of a piston rod 94 is pivotally connected to bracket 76 by means of a pin 98 which extends through it and an extension 100 that is integral with bracket 76. The other end of piston rod 94 terminates in a piston 95 within the cylinder 96. Cylinder 96 is pivotally connected to post 42 by a pin 110 and extension 112 as shown in FIGURE 3.

The piston rod 94 is caused to reciprocate within cylinder 96 by applying a fluid, such as air under high pressure through one side or the other of the piston 95 within cylinder 96. Reciprocation of the piston rod 94 is transferred through bracket 76, angle members 82 and 84, and bracket 74 to the bearing 68. By raising the pressure in line 116 to a point where it is higher than the pressure in line 114, the piston rod 94 is caused to reciprocate upwardly in cylinder 96 thereby drawing the brush with it and disengaging clutch plate 64 from clutch plate 62. This is shown in phantom in FIGURE 3. To bring the brush 56 into engagement with plates 62 and 64, the pressure in line 116 is relieved to a point where it is lower than the pressure in line 114 thereby lowering the brush 56 until clutch plates 62 and 64 engage. If brush 54 is rotating, brush 56 will be forced to rotate with it.

A cam 118 is fixed to bracket 26 and rotates with it. Cam 118 is positioned to strike cam follower 120 which is fixed to the actuating arm 122 of lever valve 302. Cam 118 strikes cam follower 120 only in certain predetermined positions of the arm 26 as described below.

The relative position between the first pivotal arm and the second pivotal arm is controlled by the cylinder 121 which is pivotally connected to bracket 28. Its piston rod 123 is pivotally connected to bracket 125 which extends from arm 38 of the second pivotal arm. Rod 123 is fixed to a piston 139 within the cylinder 121. Hence, its extension from cylinder 121 can be controlled by the application of fluid to either side of the piston 139. The amount of rotation of the first pivotable arm is controlled by the cylinder 127 which is pivotally fixed to a wall or some other immovable object and the piston rod 126 which is pivotally fixed to the bracket 28. Piston rod 126 is fixed to a piston 143 within the cylinder 127. The application of fluid to either side of the piston controls the amount of extension of rod 126 and hence the angular position of the first pivotable arm.

The operation of brush 56 is controlled in part by a sensing mechanism designated generally as 130. Sensing mechanism 130 includes a sensing arm 132 which is supported by a rod 134. Rod 134 is connected to the toggle of switch 136 which is supported at the end of brackets 138 and 140. Brackets 138 and 140 are connected to plate 141 which is rotatively connected to housing 53 by shaft 500. A chain 502 and sprockets 504 and 506 connect shaft 500 to linkage 508 and 510. Link 510 is fixed at 512. As thus connected the sensing switch remains substantially parallel to the vehicle path as the first and second arms pivot relative to each other.

The position of sensing arm 132 as it contacts the vehicle ultimately controls the application of fluid to cylinder 96 and hence determines whether brush 56 rotates with brush 54 or is disengaged and at a standstill. In operation, it is desirable that the brush 56 not be rotated when the front, front fender, rear fender and rear of a sedan type vehicle are being washed. On the other hand, the brush 56 is desirably rotated with the brush 54 when the doors of ordinary sedans and the rear fender and rear of station wagons are being washed. It is the purpose of the sensing mechanism 130 to determine when the brush 56 is to rotate by sensing the roof of the vehicle when it brushes against the arm 132 and thereby rotates the rod 134 to operate the switch 136. Switch 136 is connected in an electrical circuit which controls a valve that regulates the flow of fluid to cylinder 96 as is explained below.

The cam 150 is fixed to post 24 and rotates with it. Cam 150 is positioned to strike cam follower 152 which is fixed to the actuating arm 154 of the lever valve 290. Cam 150 actuates lever valve 290 only in certain predetermined rotated positions of the post 24 as is described below.

A lever valve 286 is mounted in a position so that its actuating arm 160 will be struck by the arm 36 when the second pivotable arm is partly knuckled over relative to the first pivotable arm. The purpose of the lever valve 286 is explained below.

The operation of the brush units 20 and 22 is not unlike that described in United States Patent 3,310,824. The vehicle 18 is caused to move through the passage between the housings 12 and 14 by means of the conveyor 16 which travels at the rate of approximately one foot per second.

The vehicle washer 10 is shown in its starting position in FIGURE 1. Thus, both brush units 20 and 22 are fully extended as shown in FIGURE 1. In this position, the brushes overlap but do not interfere with each other because they are staggered as shown. As the vehicle arrives at the position denominated 18a, the drive motors 48 and 48' will have been energized. This is effected by the vehicle 18 striking the toggle arm 162 of sensing switch 164. The energization of motors 48 and 48' causes both brushes 54 and 54' to rotate and continue to rotate throughout the entire washing operation. Simultaneously, water and soap spraying apparatus is energized. The circuitry in which sensing switch 164 is applied is described below. Sensing arms 132 and 132' will of course continue to depend downwardly along a substantially vertical axis since they have not yet been contacted by the roof of the vehicle 18. Thus, the switch 136 remains open and the piston rod 94 is held in a position within cylinder 96 that keeps the brush 56 at a standstill by disengaging the clutch plate 64 from the clutch plate 62. Thus, the brush 56 does not rotate until the switch 136 is closed.

It is the present day practice in car washing systems to use brushes having plastic bristles which are supported from central hubs. These bristles normally hang limply against the hub until the brush is rotated, where-upon centrifugal force upon the bristles causes them to stand out from the hub. It has been found that there is a certain amount of engagement between the bristles on brush 56 and the bristles on brush 54. In fact, the amount of engagement is such that the clutch plates 62 and 64 could practically be dispensed with. Accordingly, to bring the brush 56 to a full standstill when the brush 54 is rotating, it is necessary to move it well away from brush 54 so that not only do the clutch plates disengage but also the bristles. For this reason, the length of piston rod 94 and cylinder 96 as well as the distance between bushing 44 and the bearing 68 must be properly adjusted.

Figure 7:
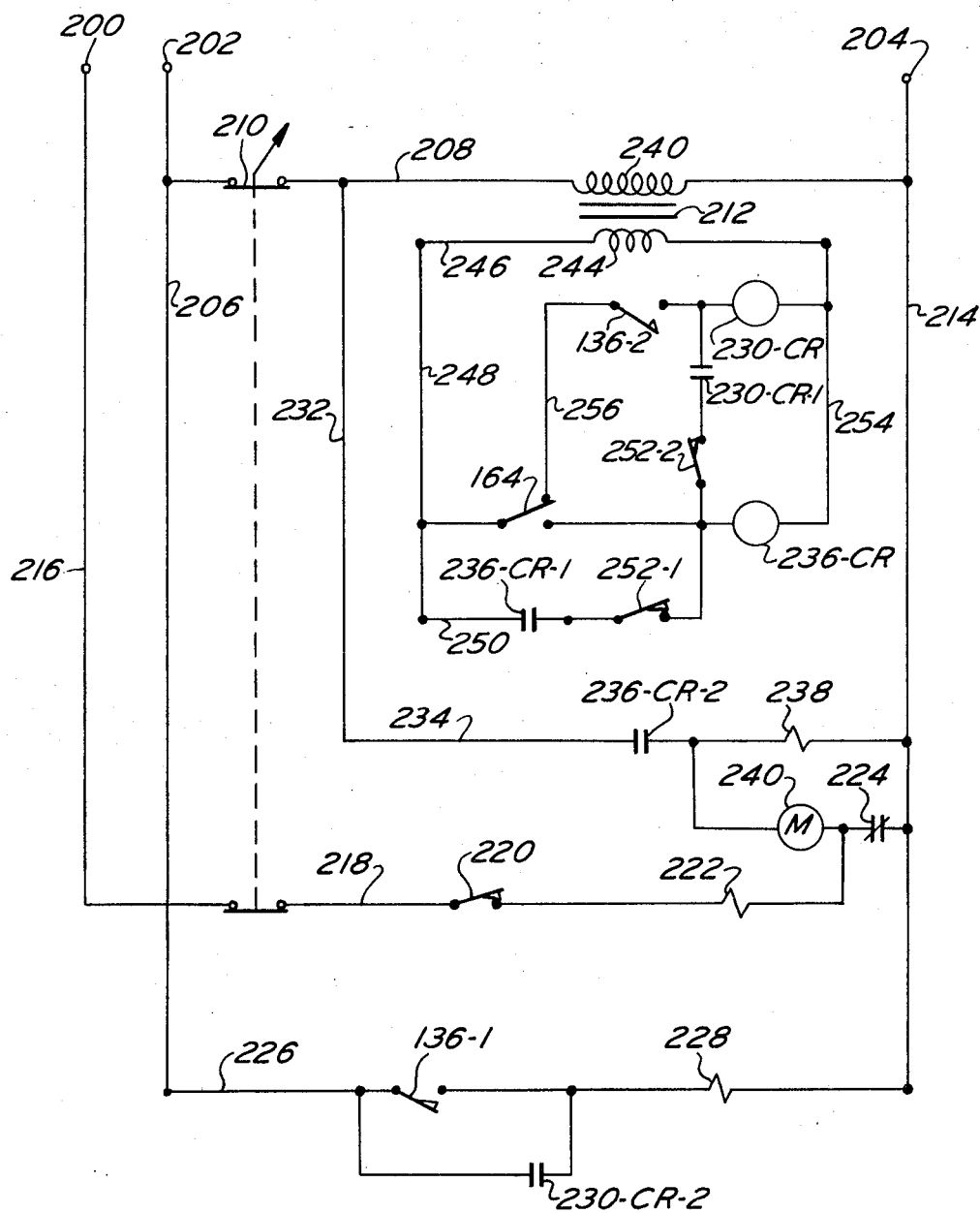
FIGURE 7 is a schematic view of the electrical circuitry used to control the rotation of one of the brush sections.

In describing the remainder of the operation of the vehicle washer 10, reference should be made to FIGURES 6 and 7 wherein the electrical and pneumatic circuitry for the system is shown schematically. Reference will first be made to FIGURE 7 and the schematic diagram of the electrical circuitry. Thereafter, reference will be made to FIGURE 6 and the pneumatic circuitry.

Electrical power for the circuit is supplied from a commercial 120 volt alternating current source and applied through the terminals 200, 202 and 204. Terminals 200 and 202 are preferably connected so as to have 120 volts alternating current applied thereto. Terminal 204 is preferably a 120 volt neutral. Voltage applied to terminal 202 develops a current which is conducted by conductor 206, and conductor 208 through off-on switch 210 through primary 240 of transformer 212 to conductor 214 and back to the neutral terminal 204. Current developed by the voltage at terminal 200 is conducted by conductor 216 to conductor 218 and then through another pole of off-on switch 210. Conductor 218 also conducts current through the normally closed retract sensing switch 220 and the coil of retract solenoid valve 222 to normally closed switch 224 which is connected to neutral conductor 214.

Conductor 206 also conducts current to conductor 226 which is connected to switch contract 136-1 of switch 136 in series with the coil 228 of a normally open solenoid valve for controlling the brush 56. Coil 228 is connected directly to neutral conductor 214. Contact 230-CR-2 of contact relay 230-CR is connected in parallel with switch 136.

Current in conductor 208 is also passed through conductors 232 and 234 to contact 236-CR-2 of contact relay 236-CR which is connected in series with the coil 238 of a solenoid valve for controlling the application of water to the vehicle 18. Coil 238 is connected to neutral conductor 214. The starting coil 240 for motor 48 is connected between the contact 236-CR-2 and the normally closed switch 224.

The foregoing completed the description of the high voltage portion of the electrical circuitry shown in FIGURE 7. The low voltage portion is now described.

As indicated above, the primary 240 of transformer 212 is connected to the input voltage of terminals 202 and 204. The secondary 244 provides low voltage for operating the contact relays 230-CR and 236-CR. The preferred voltage provided by the secondary 244 is 24 volts alternating current.

One terminal of secondary 244 is connected through conductors 246, 248 and 250 to contact 236-CR-1 of contact relay 236-CR. Contact 236-CR-1 is connected in series with normally closed exit limit switch 252 which in turn is connected to one terminal of contact relay 236-CR. The other terminal of contact relay 236-CR is connected to conductor 254 which is connected to the secondary winding 244.

Conductor 248 is also connected to entrance switch 164 which is of the single pole-double throw type. One contact of switch 164 is connected to contact relay 236-CR. The other contact is connected through conductor 256 to contact 136-2 of switch 136. Thus, switch 136 includes two single pole-single throw contact arms for completing two different circuits. As shown, contact 136-2 is connected to contact relay 230-CR which is connected to contact relay 230-CR which is connected to conductor 254. Connected in series between contact relays 230-CR and 236-CR are relay contact 230-CR-1 and contact 252-2 of normally closed exit limit switch 252. Thus, exit limit switch 252, like switch 236 has two single pole-single throw contact arms for completing two separate portions of the circuit.

That completes the description of the circuit shown in FIGURE 7. The circuit functions as follows:

Energy from the terminals 200, 202 and 204 in the form of alternating current at 110 volts is applied to the circuit by closing the switch 210 which completes the circuit through the primary 240 of transformer 212. It also completes the circuit through the series connected normally closed retracted sensing switch 220, the coil of normally open retract solenoid valve 222 and the normally closed switch 224. As the vehicle 18 arrives at position 18a, it will contact the toggle arm 162 of entrance switch 164 thereby moving it from the position shown in FIGURE 7 into contact with the opposite pole. This completes a circuit from the secondary 244 of transformer 212 through the contact relay 236-CR and back to the opposite terminal of secondary 244. The energization of contact relay 236-CR causes contacts 236-CR-1 and 236-CR-2 to close. The closing of contact 236-CR-2 completes a circuit through conductors 232 and 234 to the coil of water solenoid valve 238. This turns on the water for the apparatus which is sprayed on the vehicle 18 as it passes between the brushing units 20 and 22. The water is applied through spraying nozzles (not shown). The closing of contact 236-CR-2 also completes a circuit through the starter coil 40 of motor 48 and switch 224. Motor 48 is therefore energized and drives the brush 54. The closing of contact 236-CR-1 latches contact relay 236-CR in an energized condition until exit limit switch 252-1 is opened. Thus, water solenoid valve 238 remains energized and the motor 48 continues to drive the brush 54 even after the toggle arm 162 of switch 164 is released by the vehicle 18.

The circuit shown in FIGURE 7 remains in the condition thus far set forth while the brush operates on the vehicle in the manner to be described below. When the vehicle 18 reaches a position wherein the front windshield or some other object below the roof line but above the hood of the automobile strikes the sensing arm 132, then the rod 134 is rotated to cause the contacts of switch 136 to close. The closing of contact 136-2 of switch 136 completes a circuit to energize contact relay 230-CR, which circuit includes secondary 244, conductors 246 and 248, entrance switch 164, conductor 256, switch contact 136-2, the coil of contact relay 230-CR and conductor 254. The energization of contact relay 230-CR closes relay contacts 230-CR-1 and 230-CR-2. The closing of contact 230-CR-1 latches relay 230-CR in an energized condition until contact 252-2 of the exit limit switch 252 is opened. The closing of switch contact 136-1 as well as parallel connected contact 230-CR-2 of contact relay 230-CR energizes the coils 228 of the normally open window brush retract solenoid valve. This closes the retract solenoid valve causing the brush 56 which was heretofore held apart from brush 54 so that their respective clutch plates 62 and 64 are now brought into contact by extending the rod 94 of cylinder 96. The result is that the brush 56 now begins to rotate and will continue to rotate until contact relay 230-CR is de-energized by the opening of exit limit switch contact 252-2.

From the foregoing, it can be seen how the brush 56 is first maintained in a non-rotary position until the swich 136 is closed thereby closing the solenoid valve 228 to release the pressure applied to clyinder 96. In accordance with the circuit shown in FIGURE 7, the clutch plate 64 will remain in contact with clutch plate 62 thereby causing brush 56 to rotate until the exit limit switch 252 is opened. This means that once started, the brush 56 rotates throughout the complete operation. In some instances, it may be desirable to modify the circuit so that the switch 136 has complete control. This may be particularly desirable where it is necessary to avoid damage to aerials attached to the rear desk of an automobile. This can be accomplished by removing the contact 252–2 of exit limit switch 252 and contact 230–CR–1. The contact 136–1 is not necessary either. This means that only the contact 136–2 controls solenoid 228. Thus, when the sensing arm 132 drops off the roof as it gets over the rear deck of the vehicle, the coil of solenoid 228 will be de-energized and pressure is applied to cylinder 96 thereby raising the brush 56 and separating the clutch plates 62 and 64. The brush 56 will quickly stop rotating for the remainder of the operation.

As a special provision, the apparatus may be provided with the retract sensing switch 220 and the normally open retract solenoid valve 222. Since switch 220 is normally closed, solenoid valve 222 is energized into a closed position which means that no oil pressure is applied to cylinder 127. When switch 220 is opened and pressurized oil permitted to flow into cylinder 127, the brush is caused to retract. Switch 220 is normally positioned in or adjacent the brushes as described in copending patent application 601,744 filed Dec. 14, 1966 for Vehicle Washer and assigned to the same assignee as this present application. Switch 220 is opened only when excessive force is applied to the brush.

Exit limit switch 252 is positioned well ahead of the vehicle so that it is struck and opened after the rear end of the vehicle has moved well away from the brushing unit 20. The opening of normally closed exit limit switch contacts 252–1 and 252–2 de-energizes the contact relays 230–CR and 236–CR thereby resetting the circuit at its starting position.

Referring now to FIGURE 6, there is shown a schematic diagram of the pneumatic-hydraulic system for operating one of the units 20 or 22. In accordance with what has been described heretofore, the schematic diagram of FIGURE 6 will be directed to the brush unit 22. Elements which appear in FIGURES 1–5 are identified in FIGURE 6 with like numerals.

High pressure air for operating the pneumatic-hydraulic system is applied through the valve 260 which preferably is a ball type valve. The air is supplied at high pressure by pump means (not shown) at a pressure which is well above the operating pressure of the system. In the preferred embodiment described, the operating pressure to the required opearting pressure. In this instance, valve 262 is set to limit the pressure of air on its output side means should be capable of continuously maintaining air pressure some 5 to 10 pounds per square inch above this pressure. Those skilled in the art will recognize that the pressures recommended herein can be varied in accordance with the size and weight of the brushing unit. Thus, the pressures are sufficient for operating the embodiment described herein but are not to be regarded as limiting with respect to the invention.

An adjustable pressure control valve 262 is placed in the line with the valve 260 for adjusting the input pressure to the required operating pressure. In this instance, valve 262 is set to limit the pressure of air on its output side to 80 pounds per square inch. If desired, appropriate filters and lubricators (not shown) can be provided in the air line. Air passing through valve 262 is conducted through high pressure lines to adjustable pressure relief valves 264 and 266. Valve 264 is set to reduce the pressure on its output side to 50 pounds per square inch. Valve 266 is set to adjust the air pressure on its outlet side to 10 to 15 pounds per square inch.

Air at 10–15 pounds per square inch is applied from adjustable valve 266 to the oil in oil reservoir 268. Valve 266 is also connected to the cylinder 96 so as to apply air at 10–15 pounds per square inch to the head side of the piston 95 connected to rod 94.

Air at a pressure of 80 pounds per square inch is also applied to solenoid controlled valves 270 and 280. Valve 270 is shown in its exhaust or disconnected condition. The dotted line contained within the box which schematically represents the valve shows it when it is in its connected condition. Energization of the solenoids which control valves 270 and 280 allows them to pass the 80 pound per square inch air pressure by moving their valve members into the open position. The outlet side of solenoid controlled valve 270 is directly connected to oil reservoir 282. Thus, solenoid controlled valve 270 controls the application of pressure at 80 pounds per square inch to the oil within reservoir 282. The outlet of solenoid controlled valve 280 is connected through speed control valve 284 to cylinder 96 on the rod side of the piston 95, opposite to the side to which the 10–15 pounds per square inch pressure is applied. Thus, when solenoid controlled valve 280 permits 80 pounds per square inch pressure to be applied to cylinder 96, there is a pressure differential of 65 to 70 pounds applied to the piston which causes rod 94 to retract. Since rod 94 is connected to brush 56 as explained above, this will raise the brush. To lower the brush, solenoid controlled valve 280 must be closed thereby relieving the pressure on one side of the piston and allowing the 10–15 pound pressure to lower the brush so that the clutch plates 62 and 64 come into engagement. Valve 284 is a restrictive type valve which permits air to flow freely in one direction as indicated by the arrow and restricts the flow of air in the opposite direction. Thus, when the 80 pound pressure is removed from the cylinder, the brush will drop slowly thereby avoiding damage to the cylinder, piston or other supporting equipment.

Air at 80 pounds per square inch is also applied from the outlet side of valve 262 to the inlet of lever valve 286 which is normally closed as shown. Lever valve 286 is the type which when actuated by moving its lever brings its valve control mechanism into the dotted line position shown so that air at 80 pounds per square inch from the inlet side is conducted therethrough and applied to the pilot valve 288. Pilot valve 288 is of the type that controls whether the valve control mechanism is in the solid line or dotted line position, and hence controls another valve as explained below. Pilot valve 288 and all other pilot valves described herein may be of any well known type which are used to control other valves. The application of pressure to the lowermost sides of pilot valve 288 as shown in FIGURE 6 causes its control mechanism to move to the solid line position. The application of pressure to the upper side causes the control mechanism to move to the dotted line position.

Air pressure at 50 pounds per square inch is applied from the outlet side of adjustable pressure relief valve 264 to the normally closed lever valve 290. Lever valve 290, like lever valve 286 is operated by moving the lever attached thereto which moves the valve control mechanism from its solid line to its dotted line position. When opened, air pressure at 50 pounds per square inch passes through lever valve 290 and is applied to one side of pilot valves 292 and 288. From the foregoing, it should be apparent that the 80 pounds per square inch applied to one side of pilot valve 288 will override the 50 pounds per square inch applied to the opposite side. Hence the 50 pounds per square inch air pressure applied from valve 290 cannot control pilot valve 288 unless the 80 pounds per square inch is relieved therefrom.

Air pressure of 80 pounds per square inch is also applied to the inlet side of lever valve 294. Lever valve 294 is similar to lever valves 286 and 290 in that the position of the lever depending therefrom determines whether the valve control mechanism is in the solid or dotted line position. Lever valve 294 is normally closed which means that in its normal position the lever prevents air pressure from passing through it. The outlet side of lever valve 294 is connected to one side of pilot valve 296 which differs from the previous pilot valves in that it has a dual control function. By this, it is meant that the inlet of pilot valve 296 which is connected to adjustable pressure relief valve 264 is always connected to one of two outlets. As shown, the dual mechanism of pilot valve 296 connects air applied to its inlet at 50 pounds per square inch to the oil reservoir 298. The lower outlet connects air at 50 pounds per square inch to the cylinder 121 on the rod side of the piston 139. As shown in FIGURE 6, the valve is in a position wherein air pressure is applied to the oil reservoir 298 but not to the cylinder.

When pilot valve 296 is in the correct position, oil under pressure at 50 pounds per square inch is applied through the speed control valve 300 to the cylinder 121 on the side of the piston opposite to which the air pressure is applied. The function of speed control valve 300 is to restrict the flow of oil back into the reservoir so that when pressure is relieved from the oil reservoir and air pressure is applied to one side only of cylinder 121, the piston will not snap back and cause damage to the apparatus.

Air at a pressure of 50 pounds per square inch is also applied to the inlet side of lever valve 302. Lever valve 302, like its counterpart lever valves 286, 290 and 294, is controlled by operation of its dependent lever which moves the valve control mechanism into either the solid line or dotted line position. Lever valve 302 is a normally closed valve as shown in FIGURE 6. When lever valve 302 is opened, air at 50 p.s.i. is applied to one side of pilot valve 292 thereby causing it to open or close depending upon the pressure applied to the opposite side as controlled by lever valve 290.

Air at 50 pounds p.s.i. is also applied from valve 264 to the inlet sides of pilot valves 288 and 292. Pilot valve 288 is shown in its opened condition and pilot valve 292 in its closed condition. Accordingly, air at 50 pounds p.s.i. passes through valve 288 and is applied to the control of pilot valve 304. When opened, air pressure from pilot valve 292 at 50 pounds p.s.i. is applied to the control of pilot valve 306.

When solenoid controlled valve 270 is opened, air at a pressure of 80 pounds p.s.i. is applied to oil reservoir 282 as explained above. Therefore, oil at 80 pounds p.s.i. is forced through speed control valve 308 into cylinder 127 on the head side of piston 143. If valve 304 is opened oil also flows through speed control valve 310 and through pilot valve 304 to cylinder 127. Oil also moves to or from oil reservoir 282 through pilot valve 306 which is connected to a junction in a line connecting speed control valve 308 the outlet of pilot valve 304, and cylinder 127.

The operation of a particular unit will now be described in detail, with particular reference to the pneumatic-hydraulic circuit shown in FIGURE 6. Although the operation of the electric circuit shown in FIGURE 7 has been described in detail, general and particular reference will be made thereto where necessary in order to aid in the description.

The vehicle 18 is towed through by any conventional means such as the conveyor 16. When the vehicle 18 arrives at the position designated 18a, it strikes the toggle arm 162 of switch 164 and closes the same thereby starting the motor 48 to drive the brush 54. This also energizes solenoid 238 to start water spraying on the vehicle. It is preferable that the switch 164 also be wired into the electric circuit for the brush unit 20 to thereby start the lower brush of that unit rotating about its axis.

At the beginning of the operation, each brush unit 20 and 22 is in its extended position which places it approximately at the center of the front bumper of the vehicle 18. The conveyor 16 pulls the vehicle into engagement with the rotating brush which causes the vehicle 18 to push the brush 54 forward so that post 24 pivots about its axis. The overall effect is that the car pushes the brush 54 forward and toward the side.

Solenoid 222 is energized to close valve 270. Thus no air pressure is applied to oil reservoir 282. Air at 10–15 pounds p.s.i. is applied to oil in reservoir 268. Oil at this pressure flows into the rod end of cylinder 127, therefore tending to maintain it in an extended position against the pushing force of vehicle 18.

As the operation begins in accordance with what is described above, the normally open solenoid valve 228 is de-energized, thereby leaving valve 280 in an open condition as indicated by the solid line. Therefore air at a pressure of 80 pounds p.s.i. is applied to the rod end of piston 95. This raises the brush 56 thereby disengaging it from brush 54 and preventing it from rotating. This condition continues until switch 136 is closed to thereby energize solenoid 228 and remove the air pressure from cylinder 96.

The entire brush supporting structure including the first and second pivotable arm continues to pivot about post 24 until the cam 118 on top thereof strikes and operates the arm 122 of lever valve 302. Arm 122, as well as arms 154, 160 and 293, are of the knuckle type; that is, they operate the respective valves when struck in one direction but merely knuckle when struck in the opposite direction. This moves lever valve 302 to the dotted line position thereby permitting air at 50 pounds p.s.i. to be applied to the bottom pilots of pilot valves 292 and 296. This opens pilot valve 292 to permit air at 50 pounds p.s.i. to be applied to pilot valve 306, thereby opening it. Oil can now flow freely to and from oil reservoir 282. The application of air to pilot valve 296 positions it to permit air to be applied to the rod end of cylinder 123. This causes the piston 139 to move into the cylinder to rotate the second pivot arm with respect to the first pivot arm. Such rotation will hereinafter be referred to as knuckling if it tends to reduce the angle between the first and second pivotable arms or as unknuckling if it tends to increase that angle. The second pivotable arm cannot knuckle while the brush is in front of the vehicle 18, but the knuckling force keeps the brush 54 in contact with the front of the vehicle under almost constant pressure.

As stated above, pilot valve 296 is double acting, therefore actuation exhausts all air pressure from the oil reservoir 298 through lever valve 296. This allows oil from the piston head end of cylinder 121 to pass through speed control valve 300 into oil reservoir 298. Valve 300 is adjusted to control the rate at which the oil moves back into oil reservoir 298 to thereby avoid unwanted snap-like action, particularly when the brush 54 moves around the corner of the vehicle.

During the entire operation as thus far described, the vehicle has continued to cause the unit to rotate which extends the rod 126 out of cylinder 127. This may be referred to as retraction of the brush unit since it retracts the brushes 54 and 56 out of the path of the automobile.

After brush 54 passes around the corner of the vehicle 18, it cleans the side of the vehicle 18 while the application of air pressure to cylinder 121 continues the knuckling action until the second pivotable arm is almost fully knuckled with respect to the first pivotable arm. Post 24 now begins to rotate in the opposite direction. This ultimately brings the cam 150 into position to open lever valve 290. This permits air at a pressure of 50 pounds p.s.i. to be applied to the top pilot valves 292 and 288. Lever valve 302 has previously been released by cam 118, thereby relieving pressure from the bottom pilots of valves 292 and 296. Valves 292 and 288 move into a position wherein they exhaust air pressure from the pilots of valves 306 and 304. Exhausting air pressure from the pilots of valves 306 and 304 closes both valves, thereby shutting off the flow of oil into or out of the head end of cylinder 127. Speed control valve 308 is adjusted to permit the flow of oil only into cylinder 127. Such flow cannot occur in the absence of air pressure as controlled by valve 270. The first pivotable arm is therefore locked in position, and it cannot be moved until unlocked by lever valve 286. The cam 150 should be shaped so that it strikes the arm 154 and immediately releases it.

Lever valve 286 is positioned so that its lever 160 will be engaged by the arm 38 at a predetermined knuckling position, which as explained below, is to be when the second pivotable arm is nearly unknuckled as the brushes 54 and 56 engage the rear of the vehicle.

As the brush 54 moves further along the side of the vehicle 18, the second pivotable arm becomes, at one point, fully knuckled. In this position, the arm 38 strikes the arm 293 of lever valve 294 and opens it. This permits air at 50 pounds p.s.i. to be applied to the top pilot of pilot valve 296 thereby shifting it to the position shown in full line. Air at 50 pounds p.s.i. therefore passes through double acting pilot valve 296 and is applied to the top of the oil in oil reservoir 298. In addition, air is exhausted from the rod end of cylinder 121. This reverses the force on the piston 139 within cylinder 121 so that it applies an unknuckling force to the first and second pivotable arms. However, the arms cannot unkunckle as long as the rotating brushes 54 and 56 engage the side of the vehicle. The unknuckling force also maintains the brushes in contact with the vehicle thereby continuing the scrubbing action. The first and second pivotable arms are now free to unknuckle as soon as the brush passes over the rear corner of the vehicle 18. The brushes 54 and 56 thereafter proceed to move across the rear of the vehicle and wash the same.

As the first and second pivotable arms become nearly unknuckled, the arm 38 engages the lever 160 of lever valve 286 which it moves from its full line to its dotted line posititon to apply air at 80 pounds p.s.i. to the bottom pilot of pilot valve 288. This shifts pilot valve 288 to its open position shown in full line which permits air at 50 pounds p.s.i. to be applied to pilot valve 304. This opens pilot valve 304 by shifting it to its dotted line position and unlocks cylinder 127. Oil from reservoir 268 at a pressure of 10–15 pounds p.s.i. therefore forces the piston 143 into the cylinder. Oil at the head end of the cylinder is forced out through speed control valve 310 into oil reservoir 282. Oil passes through speed control valve 310 in the restrictive direction thereby slowing down the movement of the piston in cylinder 127 and preventing unwanted snap-like action which might limit the scrubbing on rear of car. The movement of the piston in cylinder 127 extends the first pivotable arm so that the brush moves all the way to the center of the rear bumper.

As the vehicle 18 moves away from the brush 56, the support structure therefor remains in the extended position until actuated by the next vehicle. The vehicle 18 strikes the toggle exit switch 252 thereby turning off the water and brush motor 48 until the next vehicle moves up to strike toggle 162 of switch 164 and start the brushing unit again.

As thus far described, no reference has been made to the operation of brush 56 except to mention that it is stationary when the vehicle washing cycle begins. Thus, at the beginning of the washing cycle, solenoid control valve 280 is energized so that air at 80 pounds p.s.i. is applied to the rod end of the piston within cylinder 96 thereby raising the brush 56. Solenoid control valve 280 is normally open as indicated by solid line. When coil 228 is activated by the closing of switch 136, valve 280 moves to its dotted line position thereby exhausting the air at 80 pounds p.s.i. from the rod end of cylinder 296. Accordingly, air at 10–15 pounds p.s.i. is allowed to enter the head end of cylinder 96 and force the rod 94 out of the cylinder. The flow of air from the rod end of the cylinder is restricted by speed control valve 284 so that the brush 56 drops relatively slowly. When the clutch plates 62 and 64 is engaged, brush 56 begins to rotate. This condition continues until switch 136 opens as the sensing arm is released from contact with the roof of the vehicle and contact relay 230–CR is deenergized when exit switch 252 is opened.

The height of brush 56 is selected so that it engages the average vehicle from slightly below the hood line to slightly above the roof. Since the action of this brush might tend to rip off hood ornaments and antennas, it is used to clean the vehicle only when necessary. In the case of sedans, this would be to do the side of the vehicle. In the case of station wagons, it includes both the side and rear of the vehicle. The position of sensing arm 132 as it engages the roof of the vehicle controls the action of the brush 56 in the manner described above.

If at any time excessive force is applied to the brush and switch 220 opens, then coil 222 is de-energized and valve 270 opens. Air at 80 pounds p.s.i. is applied to the oil in oil reservoir 282. The oil at the same pressure flows through speed control valve 308 onto the head end of cylinder 127 and retracts the entire brush unit.

We claim:

1. A vehicle washer including a brush unit, said brush unit being rotatably mounted, a motor connected to said brush unit for rotating the same, said brush unit including a first brush section connection to a shaft driven by said motor, said shaft being vertically aligned, said brush unit comprising a second brush section rotatable with said first brush section, said second brush section including means to cause said second brush section to cease rotation while said first brush section continuously rotates, said first brush section being fixed to said shaft, said second brush section being mounted for relative rotation with respect to said shaft, means for engaging said second brush section to said first brush section whereby said first brush section rotatably drives said second brush section, a controllable mechanism for effecting engagement and disengagement of said first and second brush sections, said first brush section being below said second brush section, said shaft extending through said second brush section, and said controllable mechanism including means for reciprocating said second brush section with respect to said shaft.

2. A vehicle washer in accordance with claim 1 wherein said engaging means includes opposed clutch plates on said first and second brush sections.

3. A vehicle washer in accordance with claim 1 wherein said means for reciprocating said second brush section on said shaft includes a cylinder, a piston rod, a means for applying fluid pressure to said piston rod within said cylinder.

4. A vehicle washer in accordance with claim 3 wherein said means for applying pressure includes a mechanical vehicle detecting means and electro-mechanically responsive means.

5. A vehicle washer including a brush unit, said brush unit being rotatably mounted, a motor for rotating said brush unit, said brush unit comprising a first brush section including bristles extending therefrom, a shaft actually extending from said first brush section, said shaft being connected to said motor whereby said motor rotatably drives said shaft, and a second brush section including bristles extending therefrom, said second brush section having a hollow shaft, said first brush section shaft extending through said hollow shaft, said hollow shaft being freely rotatable on said first section shaft, a first clutch plate on said first brush section, a second opposed clutch plate on said second brush section, and a selectively actuable hydraulic cylinder-piston means for reciprocating said hollow shaft on said first section shaft to engage and disengage said first and second clutch plates, whereby said second brush section may be selectively rotated with said first brush section.

6. A vehicle washer including a brush unit, said brush unit being rotatably mounted, a motor connected to said brush unit for rotating the same, said brush unit including a first brush section connected to and driven by said motor, said brush unit comprising a second brush section rotatable with said first brush section, said second brush section including means to cause said second brush section to cease rotation while said first brush section continues to rotate, said means to cause said second brush section to cease rotation including a reciprocable mount for said second brush section, means for engaging said second brush section with said first brush section at a predetermined position of said second brush section whereby said first brush section drives said second brush section, said reciprocable mount including a fluid motor, control means for said fluid motor, said control means including a solenoid for controlling the application of fluid to said motor, and a sensing switch in an electrical circuit for controlling said solenoid, said sensing switch being mounted in the path of a vehicle at a position to initiate the engagement of said first and second brush sections only when predetermined parts of the vehicle are adjacent said second brush section.

7. In a vehicle washer comprising a brushing unit mounted for pivotable movement between a retracted position and an extended position, said unit having two support sections pivoted together, support structure for said unit, a brush rotatably supported by a first section, means connected to said brush to rotate said brush in all relative positions of said support sections, first fluid motor means for knuckling said first and second support sections by pivoting them relative to each other, a first control responsive to the pivotal position of said second support section relative to the support structure for initiating the relative pivoting of said first and second support section, second fluid motor means for retracting and extending said second support section, locking means for holding said second support arm in a predetermined pivotal position relative to said support structure by locking said second fluid motor means, a reversing means responsive to said first and second support sections reaching a predetermined knuckling position for reversing the force generated by said first fluid motor to unknuckle said first and second support sections, and unlocking means for releasing said second fluid motor and initiating a force by said second fluid motor to extend said second support arm.

8. A vehicle washer comprising a brush unit mounted for rotation with respect to an upright axis, said brush unit including first and second coaxial brush sections with the first brush section being below said second brush section, a motor connected to said first brush section by an upright shaft, said shaft extending through said second brush section, clutch means disposed in a plane between adjacent ends of the brush sections for selectively connecting said second brush section directly to said first brush section so that the first brush section may rotatably drive said second brush section, and means for operating the clutch means while the first brush section is being rotated by said motor.

9. A vehicle washer in accordance with claim 8 wherein said clutch means includes opposed clutch plates on said first and second brush sections, and said clutch operating means including a mechanism for reciprocating said second brush section with respect to said shaft toward and away from said first brush section.

References Cited

UNITED STATES PATENTS 3,310,824  3/1967  Beer _____ 15—21
3,403,417  10/1968  Hanna et al. _____ 15—21

EDWARD L. ROBERTS, Primary Examiner

U.S. Cl. X.R.

15—53